Feb. 17, 1970  C. H. McSHAN  3,496,391
RESONANT DEVICE
Filed Dec. 7, 1967  2 Sheets-Sheet 1
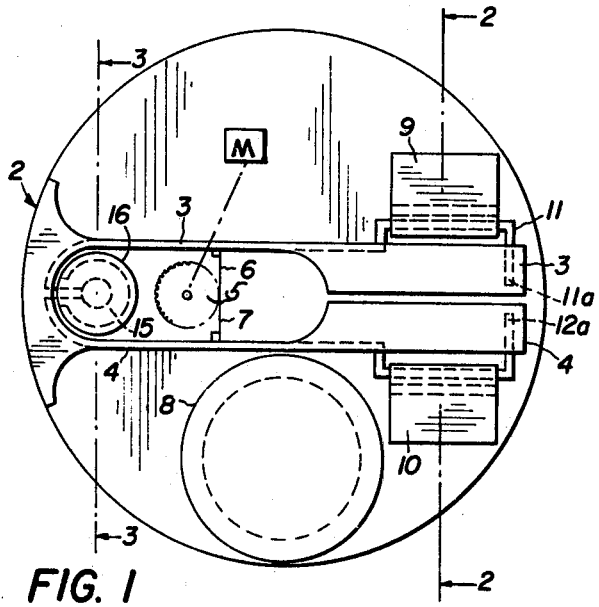
FIG. 1
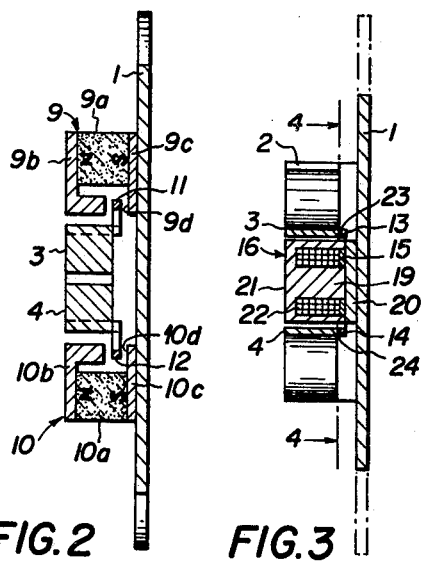
FIG. 2   FIG. 3
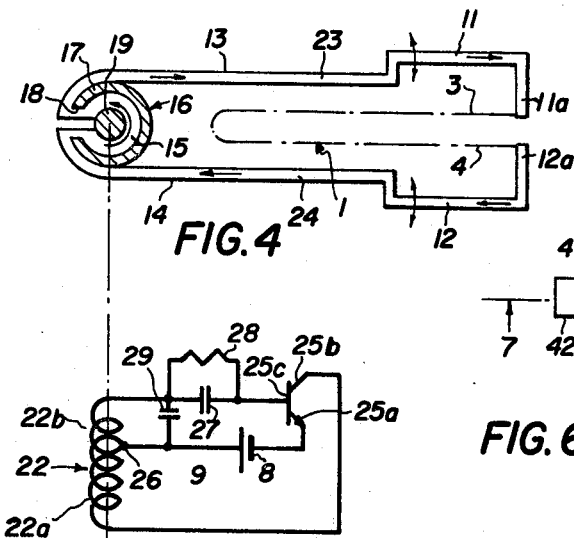
FIG. 4
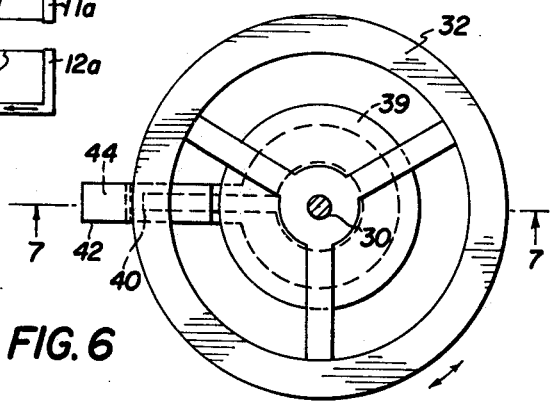
FIG. 6
FIG. 5
FIG. 7
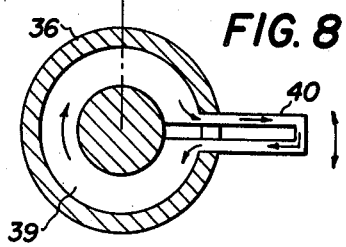
FIG. 8
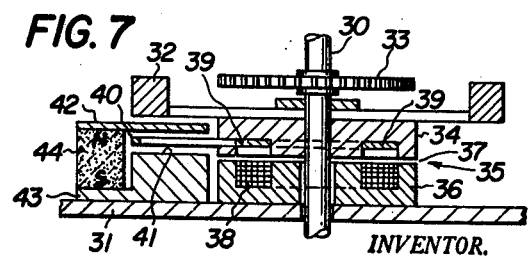
INVENTOR.
CLARENCE HUNTER McSHAN
BY McGregor & Eisenman
ATTORNEYS Feb. 17, 1970  C. H. McSHAN  3,496,391
RESONANT DEVICE
Filed Dec. 7, 1967  2 Sheets-Sheet 2
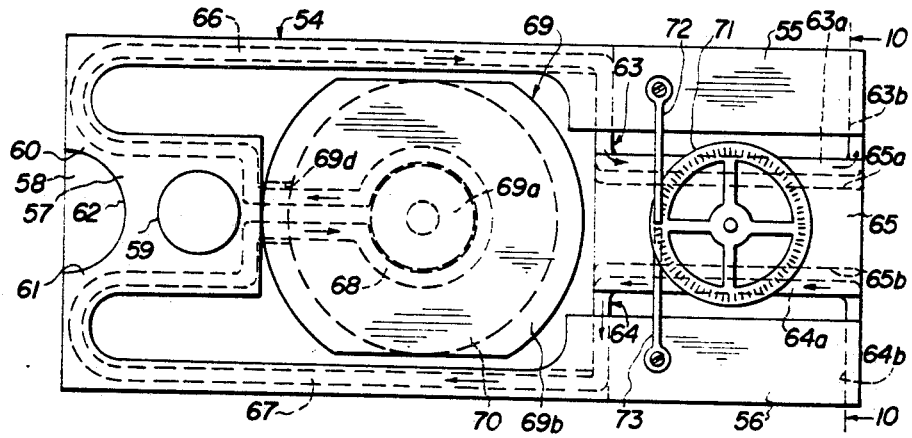
FIG. 9
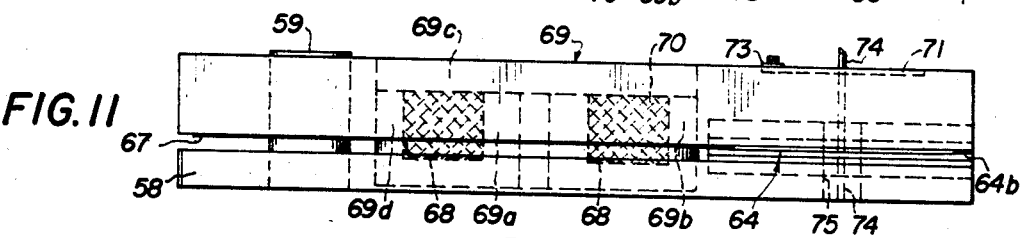
FIG. 11
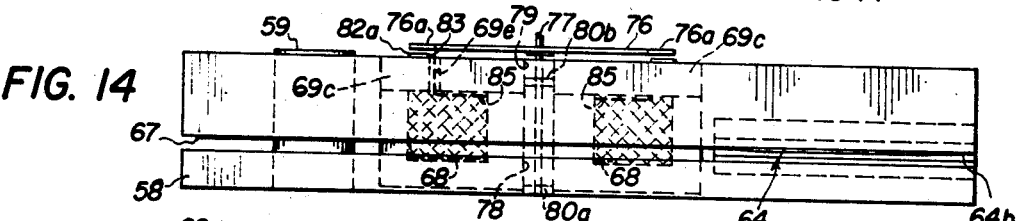
FIG. 14
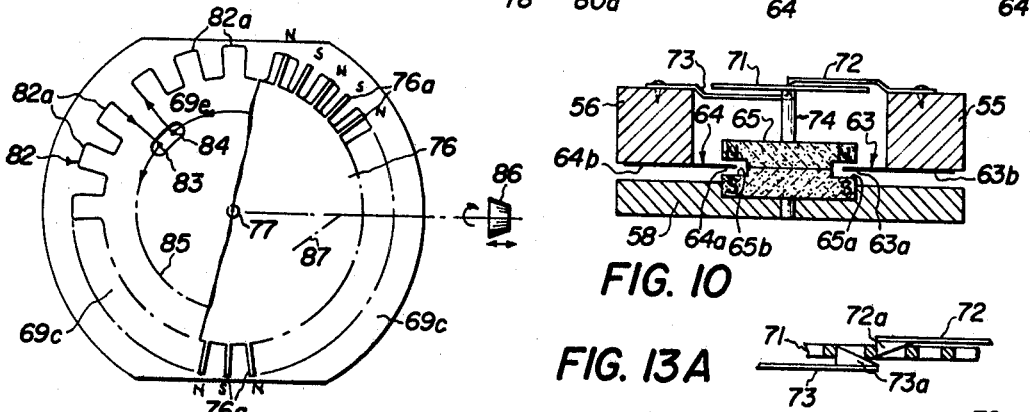
FIG. 15  FIG. 10
FIG. 13A
FIG. 13B
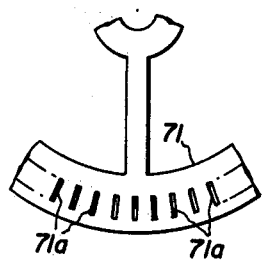
FIG. 12
INVENTOR.
CLARENCE HUNTER McSHAN
BY
McGregor & Eisenman
ATTORNEYS

United States Patent Office 3,496,391
Patented Feb. 17, 1970

3,496,391
RESONANT DEVICE
Clarence Hunter McShan, P.O. Box 392,
Northport, N.Y. 11768
Filed Dec. 7, 1967, Ser. No. 695,308
Int. Cl. H02k 33/10
U.S. Cl. 310—25
14 Claims

ABSTRACT OF THE DISCLOSURE

A resonant device electromagnetically driven by means of interaction between an electrical conductor movable with the resonant device and the pole pieces of a stationary magnetic circuit, with the electrical conductor being connected in series with one winding of a transformer to form a closed loop. The primary winding of the transformer is tapped to form two mutually-coupled coil sections defining drive and pick-up windings in an electronic circuit which is stabilized against oscillation so that signals are not generated in the absence of motion of the resonant member.

BACKGROUND OF INVENTION

This invention relates to resonant devices, such as balance wheels, tuning forks or the like, which can be used as the frequency reference for a clock, watch or other output device. In particular, it relates to an improved electromagnetic drive circuit and assembly for maintaining the resonance of the member and for transducing the time reference signal into an output motion such as the hands of a watch or clock.

Resonating elements such as balance wheels and tuning forks have long been used to furnish the frequency reference in timekeeping devices. With the development of improved electronic circuits and components, the mechanical drives which were originally used to energize the balance wheels are being replaced by electromagnetic drives, which improve the Q, the accuracy, and the efficiency. In tuning forks, which have long been driven by electronic circuits, the improved techniques have brought about similar improvements in performance and in addition have made it possible to reduce the size significantly. However, in terms of the sizes which are characteristic of the watchmaker's art, tuning-fork watches tend to be somewhat large and, while they have many advantages over balance-wheel watches, they are particularly difficult to build because of the extreme precision required in the electromagnetic drive assemblies and in the coupling to the gear trains.

Accordingly, it is an object of the present invention to provide an improved electromagnetic drive for resonant members including balance wheels and tuning forks.

Another object of the invention is to provide a simplified electromagnetic drive for resonant members in which the magnetic circuit is stationary.

Another object of the present invention is to provide an improved electromagnetically driven clock or watch which is relatively simple to fabricate while performing with a high degree of timekeeping accuracy.

Still another object of the invention is to provide an electronically controlled and driven watch or clock assembly in which a rotary output is derived from a vibrating member without resorting to mechanical couplings, such as ratchets and pawls.

In accordance with the present invention, there is provided an electromagnetic drive for a resonant member in which an electrical conductor moves with the resonant member to cut the flux of a stationary magnetic field to develop a current flow in a closed, electrically conducting loop which includes a winding of a transformer. Another winding of the transformer includes multiple turns and is divided into two parts to define mutually coupled pick-up and drive coils connected in an electronic circuit which is so arranged that upon, and only upon, the occurrence of a pulse generated by the moving conductor of the resonant member, a sharp driving pulse will be fed back through the conductor to drive the resonant member. In the case of the tuning-fork drive, the closed-loop electrical circuit includes the tuning fork itself, as well as electrical conductors carried by the tuning fork and insulated therefrom. The transformer assembly can also be integrated with a motor in the form of a multi-poled rotor and a series of single flat loops connected in series in a circle beneath magnets on the periphery of the rotor and connected in series with a supplemental transformer winding.

The above and other features and objects of the present invention will be apparent from the following specification of several preferred embodiments having reference to the accompanying drawings in which:

FIGURE 1 is a plan view, partly diagrammatic in nature and in enlarged scale, of a tuning fork and electromagnetic drive which is particularly useful in a watch movement;

FIGURE 2 is a view in transverse section taken on the line 2—2 of FIGURE 1 looking in the direction of the arrows;

FIGURE 3 is a view in transverse section taken on the line 3—3 of FIGURE 1 looking in the direction of the arrows;

FIGURE 4 is a plan view of an electrical conductor loop used in the system of FIGURE 1;

FIGURE 5 is the electronic circuit used to drive the resonant member of FIGURE 1, as well as other resonant devices disclosed herein;

FIGURE 6 is an enlarged plan view of the balance wheel portion of a clock or watch movement having electromagnetic drive;

FIGURE 7 is a view in transverse section taken on the line 7—7 of FIGURE 6, looking in the direction of the arrows;

FIGURE 8 is a plan view of an electrical conductor used in the arrangement of FIGURE 7;

FIGURE 9 is a plan view of a tuning fork and electromagnetic drive for a clock or watch of different form from that of FIGURE 1;

FIGURE 10 is a view in transverse section taken on the line 10—10 of FIGURE 9 looking in the direction of the arrows;

FIGURE 11 is a side view of the tuning fork and drive system of FIGURE 9;

FIGURE 12 is a fragmentary view in enlarged scale of a ratchet wheel used in the embodiment of FIGURES 9 and 10;

FIGURES 13A and 13B are fragmentary views in enlarged scale showing the ratchet mechanism which works in conjunction with the rathet wheel;

FIGURE 14 is a side view of a tuning fork and eletromagnetic drive assembly similar to that of FIGURES 9–11 but in which the ratchet output drive has been replaced by an electric motor integrated with a transformer; and FIGURE 15 is a fragmentary plan view showing the electric motor and transformer of FIGURE 14.

DESCRIPTION OF THE PREFERRED EMBODIMENTS

Referring to the drawings and to FIGURES 1–5 in particular, the invention is illustrated as embodied in the frequency reference portion of a timepiece such as a wristwatch shown in enlarged scale and including a base 1 of approximately the same diameter as the watch and on which is mounted a tuning fork 2 having complementary vibrating tines 3 and 4. The base of the tuning fork is secured to the base 1 with the tines offset with clearance for free vibratory movement. The various conventional parts of the watch movement, such as the gear trains, face plate and hands, are shown diagrammatically and identified by the letter M. The movement M is driven by a ratchet wheel 5 coupled to the tines 3 and 4 by pawls 6 and 7, also shown diagrammatically. As the tines 3 and 4 vibrate, the ratchet wheel 5 is turned to drive the movement.

The tuning fork 2 is excited into its resonant mode by an electromagnetic drive circuit energized by a battery cell 8. The pick-up and drive assembly, in the form of a bi-directional transducer, includes a pair of ferro-magnetic pole pieces 9 and 10 secured to the base on opposite sides of the tines. The pole pieces are substantially identical and mirror images of one another and include permanent magnets 9a and 10a polarized as illustrated and embraced respectively by soft iron pole pieces 9b–9c and 10b–10c which define narrow air gaps 9d and 10d. Secured to the tines 3 and 4 and disposed within the gap 9d and 10d are electrical conductors 11 and 12 in the form of rigid U-shaped members offset laterally from the tines. The conductors 11 and 12 are part of a closed-loop conducting circuit (FIGURE 4) including electrically conducting strips 13 and 14 firmly secured to the underside of the tines 3 and 4 to flex therewith and extending to the base of the tuning fork where they are connected together through a winding 15 of a transformer 16 mounted on the base 1 and disposed between the tines. The offset conductors 11 and 12 and the transformer winding 15 are preferably single loops formed integrally, as by stamping or electroforming, with the conductor strips 13 and 14.

The single turn winding 15, the conductors 13 and 14, which are connected to and move with the tines of the tuning fork, and the condutcors 11 and 12, which operate in the air gaps of the pole pieces 9 and 10, are connected in a single closed electrically conducting loop which includes the body of the tuning fork 1 (shown diagrammatically in FIGURE 4). To this end the conductors 11 and 12 are connected at their outer ends to the contact points 11a and 12a of the tines 3 and 4 of the tuning fork which therefore forms a short or closed circuit between the points 11a and 12a. The conductor strips 13 and 14 are bonded to the tines 3 and 4 with electrically insulating layers 23 and 24 disposed therebetween. It will be observed that the points at which the conductors 13 and 14 pass from the base of the tuning fork to the single turn winding 15 of the transformer occur at points of no motion of the vibrating tuning fork.

The transformer 16 includes a cup core of ferromagnetic material, such as ferrite, having a slot 18 through which the electrical conductors 13 and 14 pass, a central core 19 and top and bottom portions 20 and 21, best seen in FIGURE 3. The toroidal space within the transformer 16 contains, in addition to the single turn winding 15 a second multi-turn winding 22.

The electronic amplifier circuit used in conjunction with the electromagnetic tuning fork assembly of FIGURES 1–4 (as well as a balance wheel embodiment shown in FIGURES 6–8), is illustrated by FIGURE 5. A transistor 25 has its emitter electrode 25a connected to one terminal of the battery 8, the other terminal being connected to a tap 26 on the multi-turn transformer winding 22. The collector electrode 25b is connected to one terminal 22a of the transformer winding 22 and the other terminal 22b is connected to the base electrode 25c through a capacitor-resistor network 27, 28. A second capacitor 29 is connected across that portion of the transformer winding 22 defined by the tap 26 and the terminal 22b. In operation, when the circuit is first energized and the tuning fork excited, the amplifier operates in class A with the transistor 25 being biased "on" via the resistor 28. As the tuning fork builds up amplitude, the capacitor 27 back biases the circuit to type C operation causing impulse-type operation with the resistor cut off between pulses for maximum efficiency. The capacitor 29 in combination with the inductance and resistance of the circuit stabilize the circuit against self oscillation. The basic circuit and certain other appliations thereof are described and claimed in U.S. Patent Nos. 2,942,205 and 2,950,447 of C. Hunter McShan.

The rigid, flat conductors 11 and 12 operating in the narrow gaps 9d and 10d, in which there is high flux density on the order of, say, 8,000 to 18,000 gauss, generate a control pulse with each vibration of the tines. Each control pulse coupled through the transformer 16 actuates the amplifier of FIGURE 5 to cause a sharp driving pulse to be generated which is passed back through the transformer 16 to the conductors 11 and 12, in the proper direction to continue the excitation of the tuning fork.

The circuit and the operation of the system described above, are characterized by a feedback path which comprises a low pass filter designed to pass short, fast rise time pulses of the same periodicity as the resonant member or tuning fork 2 and its periodic coupling to the coil 22. The low pass filter is further designed to provide insufficient electrical feedback to maintain the circuit in oscillation when the resonant member is not in motion, and to provide through impedance reflected into the feedback path by the resonant member, when in motion, additional feedback sufficient to maintain the system in oscillation. Thus the output from the amplifier circuit is restricted to single, sharp, high rise time pulses produced by and having the same periodicity as the resonant member coupled to the coil 22. In the absence of mechanical motion, the circuit is completely stable and will not oscillate at any frequency including the frequency of oscillation of the resonant member. It is only when the member is in motion that it reflects impedance into the feedback path resulting in the provision of additional feedback which is sufficient to maintain the system in oscillation at the frequency of the mechanical motion. By virtue of this feature and the further feature that the low pass filter is designed to pass short, fast rise time pulses of the same periodicity as the periodic coupling of the resonant member with the coil 22, the output from the amplifier is restricted to single, sharp, high rise time pulses produced by and having the same periodicity as the periodic coupling of the resonant member with the coil, as required for efficient and accurate time keeping.

Referring to FIGURES 6–8, there is illustrated a balance wheel embodiment of the invention. In this arrangement, a balance staff 30 is mounted on a base 31 and carries a balance wheel 32 and a hair spring 33, the latter having the outer end anchored to the frame in the conventional manner, to maintain the balance wheel in oscillation. Secured to the underside of the balance wheel to move therewith is an upper core portion 34 of a transformer assembly 35 having a stationary lower core portion 36 secured to the base 31. The transformer core portions 34 and 36 are formed of a suitable ferro-magnetic material such as ferrite and defining a cup core. The opposed and relatively movable surfaces of the core parts 34 and 36 define a small, precision air gap 37. A transformer winding 38 of multiple turns is mounted in the lower core portion 36 and a single turn winding 39 is mounted in the movable upper portion 34.

Referring to FIGURE 8, the single turn winding 39 can take the form of a stamping of electrically conducting material such as Phosphor bronze or copper, and includes a lateral extension in the form of a single loop 40 which extends radially outwardly to be received in the gap 41 of a permanent magnet assembly secured to the base and including pole pieces 42 and 43 of soft iron and a permanent magnet 44. The transformer winding 38 corresponds to the winding 22 of FIGURE 5 and is connected in the same type of electronic circuit.

In operation, an electrical control pulse will be generated with each sweep, i.e., both directions, of the single loop conductor arm 40 through the gap 41 of the permanent magnet assembly. Each control pulse generates, in the manner described above, a driving pulse which imparts energy to the balance wheel to maintain the oscillation. As the first limb of the loop 40 enters the gap a drive pulse is generated to cause that limb to be pulled through the gap to energize the balance wheel. As the trailing limb enters the gap and the leading limb leaves, the pulse is shut off. The reverse direction of signal current flow which then occurs does not actuate the drive amplifier circuit. On the return swing, however, a drive pulse is again triggered. Thus, two driving pulses are generated for each complete oscillation of the balance wheel in contrast to many electromagnetic balance wheel drives in which there is only a single drive pulse, with the balance wheel swinging free for alternate half cycles. This direction of current flow through the loop 40 will be the same for both directions of swing. It will be seen that the spacing between limbs of the loop 40 is approximately equal to the width of the magnet (measured circumferentially of the balance whel). Because the two limbs form one loop, the control signal which is electromagnetically generated by the conductor limbs moving through the gap will reverse as the leading limb passes out of the gap and the trailing limb enters. The circuit (FIGURE 5) is responsive to only one polarity of control signal, negative or positive but not both. Thus the power or drive pulse can be made to occur with either the leading or the trailing limb in the gap.

In the configuration of FIGURES 6–8 it is preferred to drive the gear train from a source separate from the balance wheel. An example of such drive is described below in conjunction with FIGURES 14 and 15 in which a motor is driven through the transformer directly from the amplifier (FIGURE 5) but under the frequency control of the resonant member, i.e., the balance wheel or the tuning fork, as the case may be. In the event the balance wheel and balance staff 30 are used in a more conventional manner to drive the gear train, it is preferred to impart more energy to the balance wheel from the amplifier circuit. To this end the permanent magnet 42 is made wider, say 90° of arc, measured around the balance wheel, and the conductor limbs of the loop 40 are similarly spread. Thus a longer drive pulse of about 90° of mechanical arc and 20° electrically will be produced by the amplifier in response to the control signal. For most cases it is preferred that the spacing between the limbs of the conductor loop 40 be spaced apart slightly more than the width of the magnet in the direction of conductor motion.

It will be seen that in the arrangement of FIGURES 6–8 the entire closed loop assembly 40–41 moves in oscillation, as contrasted to a portion of the corresponding single loop assembly in the arrangement of FIGURES 1–5 and other tuning fork arrangements described below.

Referring to FIGURES 9–13, there is illustrated a modification of the design of FIGURES 1–5 concerned principally with the geometry of the tuning fork, the arrangement and interaction of the parts, and the output driving means. A tuning fork 54 having vibratory tines 55 and 56, preferably mass loaded at their free ends, is mounted by means of an inwardly extending base portion 57 to a supporting frame piece 58, which for convenience is shown as being approximately the same size as the outer limits of the tuning fork but which can assume any desired configuration. The base 57 of the tuning fork 54 is joined to the supporting frame piece by means of a torsion pin 59 which can be formed with splines and press-fitted into suitable aligned openings in the tuning fork base and the frame. It will be observed that the tuning fork base 57 is disposed between the tines and that any slight imbalance of the tuning fork or shock will translate itself into torsional stress in the pin 59, which therefore functions as a torsion spring elastically coupling the tuning fork to the base.

The tines of the tuning fork have a bending moment with respect to the base and the elasticity is controlled by controlling the thickness at the respective tine roots 60 and 61. Certain adjustments in the frequency can be effected by controlling the thickness at these points. To effect this adjustment, a circular cut 62 is made in the base and, by simple precision shifting of the center of the cut toward one or the other tines, the flexing constriction points 60 and 61, as the case may be, can be relatively varied as part of the manufacturing procedure.

Mounted on the underside of the tines 55 and 56, at their free or vibrating ends, are a pair of single strip conductors 63 and 64, respectively, which form self-supporting, single turn loops projecting into the space between the tines. The conductor loops include longitudinally aligned strips 63a and 64a and transverse end portions 63b and 64b which are joined both mechanically and electrically to the respective tines of the fork. The other ends of the conductors 63 and 64 are also mechanically coupled to the tines of the fork but are electrically insulated therefrom by an interposed insulating layer, such for example as deposited silica on the underside of the fork. Similarly, electrical conductors 66 and 67, which are joined to the conductor loops 63 and 64, respectively, can be deposited over the insulating layer to form conducting paths which lead to the tuning fork base 57, at which point they are joined to the respective ends of a winding 68 of a transformer 69 disposed between the tines of the tuning fork and carried by the base. The winding 68 is preferably a single turn and the coupling to the tuning fork is at points of no motion.

The transformer 69 includes a cup core formed of ferrite or other suitable ferro-magnetic material and including a central core portion 69a, an integrally formed base and cylindrical side wall 69b, and a cover portion 69c with abutting surfaces. The toroidal space within the cup core is filled with, in addition to the single turn winding 68, a multi-turn winding 70 which corresponds to the winding 22 of the circuit diagram of FIGURE 5, which circuit can in identical form be used with this embodiment.

The single turn transformer winding 68 is connected as part of a closed loop circuit, which includes (1) the conductor 66 affixed to but insulated from the underside of the tuning fork to move therewith, (2) the single loop or conductor 63 which extends inwardly from the tine 55 and which is electrically connected to that tine at its outer end in a junction 63b, (3) the tuning fork body including the tine 55, the base 57 and the tine 56 to the junction 64b, (4) the loop or conductor 64 which extends inwardly from the tine 56, and (5) the conductor 67 which is secured to but insulated from the underside of the tine 56 back to the single turn transformer winding 68. The strip conductor sections 63a and 64a of the conductor loops 63 and 64 are received within small gaps 65a, 65b of a permanent magnet assembly 65 secured to the base 58. The magnet 65 can take the form of two mated mirror-image parts of magnetic material polarized as shown in FIGURE 10, to provide high flux density in each gap. Connected in the circuit of FIGURE 5, the system is self-starting when energized and the tines will vibrate causing control signals to be generated when the conductors 64a and 65a cut flux in the permanent gaps and sharp driving pulses to be generated causing high current flow through the conductors, all as described in the afore-cited McShan patents and above.

The vibratory motion of the tines can be converted to rotary motion through a ratchet system in the form of a ratchet wheel 71 driven by pawls 72 and 73 secured respectively to the tines 55 and 56. The ratchet wheel 71 is mounted on a rotary shaft 75, which finds a bearing in the permanent magnet 65 within a central opening 75 therein. It will be understood that the shaft 74 is connected to an output system, such as a gear train connected to the hands of a small wristwatch.

As best seen in FIGURES 12, 13a and 13b, the pawls 72 and 73 are disposed in opposition and on opposite sides of the ratchet wheel 71 and include jeweled, cam surfaced tips 72a and 73a which work in conjunction with radial slots 71a (FIGURE 12) formed in the ratchet wheel. As the tines 55 and 56 of the turning fork vibrate toward and away from each other, the one pawl tip will pull the ratchet wheel for one direction of motion while the other will push the ratchet wheel in the opposite direction of motion, with the inclined or camming surfaces of the tips lifting the resilient pawls over the metal between adjacent slots 71a in the wheel.

Referring to FIGURES 14 and 15, there is illustrated another technique for obtaining controlled rotary motion from the electromagnetically driven tuning fork. In this arrangement, there is no mechanical coupling between the moving tines and the rotary otuput shaft, thus simplifying the manufacture and balancing of the fork and also improving the Q of the fork. An electrical motor including a rotor 76 carried on a shaft 77 is journaled in thrust and lateral bearings 80a and 80b in central openings 78 and 79 formed respectively in the core portions 69a and 69b.

The perimeter of the rotor 76 includes a plurality of, say, 60 radial fingers 76a which are formed of magnetic material. Alternate radial fingers 76a are oppositely polarized, north and south. Disposed directly beneath the rotor 76 beneath the radial fingers 76a is an electrical conductor 82 formed in a series of flat loops 82a, with each loop having a size equal to the spacing of two adjacent magnetic fingers 76a of the rotor 76. The series of flat loops extend around the perimeter of the transformer core cover 69c and are electrically insulated therefrom by a suitable insulating layer which can take the form, for example, of deposited silica on which the conductor 82 can in turn be electro-deposited. The end terminals 83 and 84 of the multi-looped conductor 82 are connected to a single turn winding 85 (also shown in FIGURE 14) in the transformer 69 so that there is a single conducting loop or circuit which includes the single turn transformer loop 85 and the multi-looped conductor 82. The two terminals of the conductor 82 and the two terminals of the single loop transformer winding 85 are joined by conductors 83 and 84 which pass downwardly through a slot 69e in the transformer core cover 69c. It will be understood that the single turn transformer winding 85 is in addition to the single turn winding 68 which is part of the loop circuit which forms the electromagnetic pickup and drive for the tuning fork.

In operation, with the tuning fork in vibration and with the rotor 76 started in a given direction, it will continue to rotate in a synchronous output drive motion which is directly proportional to the frequency of vibration of the tuning fork and the number of radial magnet fingers 76a on the rotor, e.g., if the tuning fork frequency is 720 and there are 60 radial magnetic fingers 76a on the armature or rotor, the wheel will turn at 24 r.p.s. The shaft 77 is connected to a suitable gear train (not shown) which in turn drives the watch hands or other timer output. The motor is not self-starting and, in order that the rotor always begins its motion in the correct direction, the hand-adjusting knob 86 (shown diagrammatically in FIGURE 15) includes a mechanical linkage 87 to the rotor 76 which arrests all rotor motion when the adjusting knob is pulled out to set the hands and which kicks the rotor in the appropriate starting direction when the knob 86 is pushed inward.

As described above in conjunction with FIGURES 6–8, the motor output or gear train drive of FIGURES 14 and 15 can be used with the balance wheel configuration. In such arrangement, the synchronous motor can be integrated with the underside of the transformer 35 as viewed in FIGURE 7 by providing a suitable access opening in the base plate 31. It will be understood that in such case a bearing for the balance staff 30 would be provided within the central opening of the transformer with the same bearing assembly being used for the rotor of the motor.

Also referring to FIGURES 6–8, various other magnetic circuit configurations can be provided for the swinging loop 40 and permanent magnet 44. For example, the two limbs of the conductor loop 40 can be integrated with the balance wheel and take the form of spokes, with the rim between the conducting spokes being electrically conducting and also electrically insulated as by slots, for example, from the rest of the balance wheel. Also, a field field structure can be provided in which there are permanent magnets embracing the rim of the balance wheel above and below in the form of arcuate bars of ferrite. The bars can be polarized to provide a continuous flux path from one end of the upper magnet downward to the adpacent but oppositely polarized end of the lower magnet and then upwardly from the opposite end of the lower magnet to the upper magnet. In such an arrangement, magnetic flux will flow in opposite directions at opposite ends of the gap and, by making the spacing between the conductor limbs of the closed loop approximately half the width of the magnets (circumferentially speaking), additive control voltage signals can be generated to the loop for one direction of travel. By such an arrangement, it is possible to effect a driving pulse across the precise point of maximum balance wheel velocity. On the other hand, it is not possible by such an arrangement to achieve a driving pulse for each direction of swing of the balance wheel.

In so far as operation of the motor output is concerned, it will be understood that the motor and the tuning fork, in the arrangement of FIGURES 14 and 15, are locked together by the sine wave counter E.M.F.'s of the tuning fork and the motor and both are energized periodically by the sharp driving pulse which is characteristic of the electronic circuit. The same effect can occur in the torsional mode devices, such as the balance wheel arrangement of FIGURES 6 and 7, to which a motor might be added in the manner described above, although in the particular embodiment illustrated there is not a continuous sine wave generated by the balance wheel because the conductor loop 40 swings out of the magnetic gaps. It is possible, however, to provide a torsional mode device, such as a balance wheel, which has a relatively short arc of oscillation. This can be accomplished, for example, by providing tension ribbon supports for the balance wheel in place of the balance staff and coiled hair spring. By this arrangement, the oscillation of the balance wheel can be limited to the length of the travel in the magnetic gaps and a sine wave can be generated.

It should be understood that the number of turns in the transformer winding 68, while illustrated as a single turn, should be selected for appropriate impedance matching and energy transfer, and that it is possible that two, three or more turns might be used. Similarly, additional turns might be provided on the secondary 85 and, under certain circumstances, additional conductor loops can be provided at the ends of the tuning fork to provide increased voltage and decreased current flow in the bidirectional transducer, in which control signals and driving signals flow.

It will be observed also that in the illustrated tuning fork arrangements of FIGURES 1–4 and 9–14, the transducer conductors at the ends of the tines are in each case shown as projecting laterally from the bottoms of the tines. This necessarily introduces certain torsional forces which may or may not be desirable, depending on such factors as ratchet wheel loading of the tines. To avoid torsional forces, the laterally projecting conductor loops can be disposed at points midway between the top and bottom surfaces of the tines. On the other hand, if it is desired to utilize the torsional mode, the illustrated, eccentric mounting can be used to achieve it. In such cases, it should be understood that the tuning fork geometry would be arranged so that the tines flex about their longitudinal axes more readily than moving in and out toward each other in more conventional tuning fork operation.

While the motor in the arrangement of FIGURES 14 and 15 has been illustrated with the axis of the rotor 76 being disposed on the central axis of the transformer core, it will be understood that the rotor shaft can be offset from the transformer and the flat wound field windings 82 can be included on a separate substrate member. Alternatively, the rotor can be offset from the transformer with the permanent magnets 76a on the perimeter of the rotor 76 overlapping the base 69c of the transformer. In such case, the flat wound field windings 82a can be arranged on the transformer base in an arc underlying the perimeter of the rotor wheel. In extremely small sizes, the so-called flat wound rotor windings can be applied by vacuum deposition on an insulating layer also applied by vacuum deposition. Also, the substrate surfaces can be formed with recesses, by etching, in order to receive the depositions.

As a further modification, the closed electrical loop, examples of which are shown in FIGURES 4 and 8, can for a tuning fork take the form of a conductor laterally offset from one tined near its outer end and joined to the tine electrically at two points along the length of the tine to form a closed electrical path within the tine (as opposed to passing through the body of the tuning fork from tine to tine). Alternatively, the closed loop can take the form of a single, integrated conductor loop, such as a stamping, which is carried by the tine. The offset conductor limb, corresponding for example to the offset conductor limb 11 of FIGURE 4, can pass as one rigid, immovable member through both a magnetic field defined by stationary magnets and through a closely adjacent transformer core which, in lieu of the cup core configurations described above, can take the form of a more conventional rectangular configuration, with its central opening aligned with the tines. In this fashion, both a portion of the transducer and the secondary winding of the transformer are again part of the same closed electrically conducting loop. If desired, the magnetic field structure and the adjacent transformer can be integrated in part so that permanent magnet flux flows in the core material. The primary transformer winding, preferably tapped to form control and drive sections as shown in FIGURE 5 is connected to the amplifier, and, if desired, another secondary winding can be connected to a motor. The electrically conducting loop can be connected outside the tuning fork tine as disclosed in FIGURE 1, or between the tines as disclosed in FIGURE 9. Also, identical loop assemblies can be disposed on the respective tines. If closed loops are provided on both tines, it will be understood that the current loops work independently rather than the series additive arrangement of FIGURES 1 and 9. While the current paths are independent, both loops work additively in the transducer and the transformer through which both pass.

By using the above described arrangements, it is possible to provide additional transformer core material, thereby improving the efficiency of the transformer. Also, the current paths and values in the two closed loops are significantly decreased, thereby minimizing $I^2R$ losses.

The electrically conductive loop, while illustrated above as being entirely movable with the resonator (FIGS. 6–8) and as partially carried by and movable with the resonator (FIGS. 1–5 and 9–14), can be entirely stationary by reversing the transducer parts, i.e. putting the magnets on the resonator and mounting the electrical conductor on the base. The resonator can also take various other forms. In addition to the tuning fork (which can now be driven in either an in-and-out vibratory mode or a torsional mode) and the torsional devices such as balance wheels (which can swing in a large arc of, say, 270° or a small arc less than 90°), the resonator can take the form of example of a vibratory reed or of a hairpin configuration in which the ends are anchored and the side limbs bow out and in under the electromagnetic drive forms.

I claim:

1. A timing device comprising resonator means; transducer means including relatively movable magnet means and electrical conductor means incuding a single conductor in a single loop movably controlled by the resonator means; and electrically conductive loop including said electrical conductor means of the transducer; a magnetic transformer core means coupling the conductive loop to the core to form a transformer secondary winding; a transformer primary winding on the core; and amplifier means coupled to the primary winding to sustain resonance of the resonator means.

2. A timing device comprising resonator means; and means to excite the resonator means including an electrically conducting loop including a single conductor in a single loop carried at least in part by the resonator means and movable at least in part therewith; magnetic field means proximate a movable portion of the electrically conducting loop and interacting therewith to form a bidirectional electromechanical transducer to generate control signals in response to resonator motion and to excite the resonator in response thereto; transformer means including a secondary winding coupled to the electrically conducting loop and a primary winding; and amplifier means connected to the primary winding to respond to control signals to generate driving pulses in the electrically conducting loop.

3. Apparatus as set forth in claim 2, said resonator means comprising a tuning fork, the electrically conducting loop of the transducer including an electrical conductor disposed laterally of the moving tine and carried thereby and electrical conductors connecting the conductor in series with the secondary winding of the transformer.

4. Apparatus as set forth in claim 2, said resonator means comprising a tuning fork, said electrically conducting loop including a pair of conductor portions carried by and movable with the respective tines, and means connecting the conductors in series with the secondary winding.

5. Apparatus as set forth in claim 2, said resonator means comprising a tuning fork, said electrically conducting loop including a pair of conductor portions carried by and movable with the respective tines, one end of each conductor portion being connected to the tuning fork which forms a series electrical circuit between the conductors, and conductor means connecting the other ends of the conductor portions in series with the secondary winding of the transformer.

6. Apparatus as set forth in claim 5, the electrical connection between the laterally disposed conductors and the secondary winding being disposed at the base of the tuning fork.

7. Apparatus as set forth in claim 6, said transformer being disposed between the tines.

8. Apparatus as set forth in claim 6 including motive means driven by the tuning fork.

9. Apparatus as set forth in claim 8, said motive means comprising a ratchet wheel disposed between the tines and pawls carried by the tines to drive the wheel.

10. Apparatus as set forth in claim 9, said ratchet wheel comprising a flat wheel having its plane in the plane of tine vibration and having a radially slotted periphery, the pawls operating in push-pull relationship in the radial slots.

11. Apparatus as set forth in claim 6, said laterally disposed conductors being disposed between the two tines, and a stationary magnet field structure forming flux gaps in which the conductors are disposed.

12. Apparatus as set forth in claim 2, said resonator means comprising a torsional mode resonator, said electrically conducting loop being carried by the resonator and including a central coaxial portion defining the secondary winding of the transformer and the portion of the loop which is part of the transducer comprising a radially extending portion adapted to swing in the magnetic field, said loop including the secondary winding being movable with the torsional mode resonator.

13. Apparatus as set forth in claim 12, said transformer means comprising a split cup core having a portion coaxial with and movable with the torsional resonator, and a fixed portion closely coupled thereto, the secondary winding being in the movable portion and the primary winding in the fixed portion.

14. A timing device comprising a base; a tuning fork resonator mounted on the base having a pair of tines extending outwardly in cantilever fashion therefrom; a mounting portion on the base formed integrally therewith and extending between the tines; a support for the tuning fork adjacent the base and a torsionally resilient pin normal to the plane of the tuning fork joining the mounting portion of the base of the tuning fork to the support to decouple the fork from the base.

References Cited

UNITED STATES PATENTS

| | | | |
|---|---|---|---|
| 3,123,755 | 3/1964 | Braithwaite et al. | 318—132 |
| 2,926,313 | 2/1960 | Wiegand | 331—154 |
| 3,365,635 | 1/1968 | Shelley | 318—128 |
| 3,257,794 | 6/1966 | Bennett et al. | 58—23 |
| 2,950,447 | 8/1960 | McShan | 331—116 |
| 3,309,590 | 3/1967 | Reich | 318—128 |
| 3,238,431 | 3/1966 | Raval | 318—130 |
| 3,351,788 | 11/1967 | Farre | 310—22 |
| 3,403,312 | 9/1968 | Sparing | 331—116 XR |
| 3,402,301 | 9/1968 | Gibb | 331—116 XR |

FOREIGN PATENTS

| | | |
|---|---|---|
| 1,482,412 | 5/1967 | France. |
| 1,224,395 | 6/1963 | France. |

MILTON O. HIRSHFIELD, Primary Examiner

B. A. REYNOLDS, Assistant Examiner

U.S. Cl. X.R.

58—23; 84—457; 310—36, 37; 318—128; 331—116, 156